United States Patent
Eisner et al.

(10) Patent No.: US 10,691,877 B1
(45) Date of Patent: Jun. 23, 2020

(54) HOMOGENOUS INSERTION OF INTERACTIONS INTO DOCUMENTS

(71) Applicant: Amazon Technologies, Inc., Reno, NV (US)

(72) Inventors: Noah Anthony Eisner, Menlo Park, CA (US); Nagesh Pradhan Cadabam, Sunnyvale, CA (US); Cynthia Zhang Taylor, San Leandro, CA (US); Kevin Gillett, Menlo Park, CA (US); Wei Lien Stephen Dang, Mountain View, CA (US); Catherine Emily Harrell, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 14/175,888

(22) Filed: Feb. 7, 2014

(51) Int. Cl.
  *G06F 17/00* (2019.01)
  *G06F 40/169* (2020.01)
  *G06F 40/197* (2020.01)

(52) U.S. Cl.
  CPC .......... *G06F 40/169* (2020.01); *G06F 40/197* (2020.01)

(58) Field of Classification Search
  CPC ........................... G06F 17/241; G06F 3/04842
  See application file for complete search history.

(56) References Cited

U.S. PATENT DOCUMENTS

| | | |
|---|---|---|
| 5,251,315 A | 10/1993 | Wang |
| 5,577,188 A | 11/1996 | Zhu |
| 5,596,754 A | 1/1997 | Lomet |
| 5,832,470 A | 11/1998 | Morita et al. |
| 5,878,398 A | 3/1999 | Tokuda et al. |
| 5,911,140 A | 6/1999 | Tukey et al. |
| 5,991,713 A | 11/1999 | Unger et al. |
| 6,314,425 B1 | 11/2001 | Serbinis et al. |
| 6,397,205 B1 | 5/2002 | Juola |
| 6,442,555 B1 | 8/2002 | Shmueli et al. |

(Continued)

FOREIGN PATENT DOCUMENTS

| | | |
|---|---|---|
| EP | 1881440 A1 | 1/2008 |
| JP | H10240220 A | 9/1998 |

(Continued)

OTHER PUBLICATIONS

International Search Report and Written Opinion dated Mar. 31, 2015, in International Patent Application No. PCT/US2014/64875, filed Nov. 10, 2014.

(Continued)

*Primary Examiner* — Andrew T McIntosh
(74) *Attorney, Agent, or Firm* — Davis Wright Tremaine LLP

(57) ABSTRACT

Organizations maintain and generate large amounts of documentation and entities of these organizations often need to collaborate on generating and reviewing this information. There is a need to maintain and store this documentation remotely in such a way that the entities of these organizations may collaborate with each other. To ensure that entities of the organization can collaborate on documents, an overlay creation and storage system is described. The overlay may be usable by a computing device operated by the entities of the organization. Furthermore, information contained in the overlay may be injected into the document.

20 Claims, 9 Drawing Sheets

(56) References Cited

U.S. PATENT DOCUMENTS

| | | | |
|---|---|---|---|
| 6,505,195 B1 | 1/2003 | Ikeda et al. | |
| 6,553,365 B1 | 4/2003 | Summerlin et al. | |
| 6,687,876 B1* | 2/2004 | Schilit | G06F 17/241 |
| | | | 715/231 |
| 6,687,878 B1* | 2/2004 | Eintracht | G06F 17/241 |
| | | | 715/201 |
| 6,725,239 B2 | 4/2004 | Sherman et al. | |
| 6,763,346 B1 | 7/2004 | Nishida et al. | |
| 7,177,886 B2 | 2/2007 | Pruet, III | |
| 7,882,110 B2 | 2/2011 | Bahr | |
| 8,271,574 B1 | 9/2012 | Srinivasan et al. | |
| 8,429,753 B2 | 4/2013 | Skaria et al. | |
| 8,527,461 B2 | 9/2013 | Ducott, III et al. | |
| 8,655,950 B2* | 2/2014 | Scherpa | G06Q 10/10 |
| | | | 709/204 |
| 8,825,502 B2 | 9/2014 | Bormann et al. | |
| 8,843,494 B1 | 9/2014 | Sampson | |
| 8,938,669 B1 | 1/2015 | Cohen | |
| 9,020,893 B2 | 4/2015 | Zalpuri et al. | |
| 9,047,368 B1 | 6/2015 | Cooley | |
| 9,106,687 B1 | 8/2015 | Sawhney et al. | |
| 9,208,153 B1 | 12/2015 | Zaveri et al. | |
| 9,253,075 B1 | 2/2016 | Jacobson et al. | |
| 9,270,446 B2 | 2/2016 | Ayday et al. | |
| 9,400,800 B2 | 7/2016 | Jacobson et al. | |
| 9,449,182 B1 | 9/2016 | Dang et al. | |
| 9,536,047 B2 | 1/2017 | Ayday et al. | |
| 9,633,100 B2 | 4/2017 | Kashyap et al. | |
| 9,832,195 B2 | 11/2017 | Gillett et al. | |
| 9,880,989 B1 | 1/2018 | Cadabam et al. | |
| 10,257,196 B2 | 4/2019 | Dang et al. | |
| 2001/0042085 A1 | 11/2001 | Peairs et al. | |
| 2002/0138529 A1 | 9/2002 | Yang-Stephens et al. | |
| 2003/0061221 A1 | 3/2003 | Ito et al. | |
| 2003/0074368 A1 | 4/2003 | Schuetze et al. | |
| 2004/0068697 A1 | 4/2004 | Harik et al. | |
| 2004/0205542 A1 | 10/2004 | Bargeron et al. | |
| 2004/0210833 A1 | 10/2004 | Lerner et al. | |
| 2004/0230577 A1 | 11/2004 | Kawatani | |
| 2004/0267746 A1 | 12/2004 | Marcjan et al. | |
| 2005/0010799 A1 | 1/2005 | Kelley et al. | |
| 2005/0022106 A1 | 1/2005 | Kawai et al. | |
| 2005/0034062 A1 | 2/2005 | Bufkin et al. | |
| 2005/0038787 A1 | 2/2005 | Cheung et al. | |
| 2005/0044494 A1 | 2/2005 | Barnes et al. | |
| 2005/0055306 A1 | 3/2005 | Miller et al. | |
| 2005/0160356 A1 | 7/2005 | Albornoz et al. | |
| 2005/0240580 A1 | 10/2005 | Zamir et al. | |
| 2005/0251675 A1 | 11/2005 | Marcjan et al. | |
| 2006/0053365 A1 | 3/2006 | Hollander et al. | |
| 2006/0125846 A1 | 6/2006 | Springer et al. | |
| 2006/0150079 A1* | 7/2006 | Albornoz | G06F 17/241 |
| | | | 715/230 |
| 2006/0183462 A1 | 8/2006 | Kolehmainen | |
| 2006/0248083 A1 | 11/2006 | Sack et al. | |
| 2006/0294311 A1 | 12/2006 | Fu et al. | |
| 2007/0011140 A1* | 1/2007 | King | H04N 1/00244 |
| 2007/0118795 A1 | 5/2007 | Noyes et al. | |
| 2007/0150802 A1 | 6/2007 | Wan et al. | |
| 2007/0156732 A1 | 7/2007 | Surendran et al. | |
| 2007/0208994 A1 | 9/2007 | Reddel et al. | |
| 2007/0271249 A1 | 11/2007 | Cragun et al. | |
| 2008/0040342 A1 | 2/2008 | Hust et al. | |
| 2008/0052291 A1 | 2/2008 | Bender | |
| 2008/0222512 A1 | 9/2008 | Albornoz et al. | |
| 2009/0217158 A1* | 8/2009 | Bailey | G06F 17/24 |
| | | | 715/255 |
| 2009/0260060 A1 | 10/2009 | Smith et al. | |
| 2009/0265747 A1 | 10/2009 | Li | |
| 2010/0010998 A1 | 1/2010 | Wagner | |
| 2010/0030578 A1 | 2/2010 | Siddique et al. | |
| 2010/0095203 A1 | 4/2010 | Toebes et al. | |
| 2010/0174983 A1 | 7/2010 | Levy et al. | |
| 2010/0211781 A1 | 8/2010 | Auradkar et al. | |
| 2010/0241668 A1 | 9/2010 | Susanto et al. | |
| 2010/0318893 A1 | 12/2010 | Matthews et al. | |
| 2010/0325686 A1 | 12/2010 | Davis et al. | |
| 2011/0055180 A1 | 3/2011 | Lumley et al. | |
| 2011/0078615 A1 | 3/2011 | Bier | |
| 2011/0088091 A1 | 4/2011 | Petronijevic et al. | |
| 2011/0099152 A1 | 4/2011 | Law et al. | |
| 2011/0145593 A1 | 6/2011 | Auradkar et al. | |
| 2011/0153680 A1 | 6/2011 | Rolla et al. | |
| 2011/0178981 A1 | 7/2011 | Bowen et al. | |
| 2011/0197266 A1 | 8/2011 | Chu et al. | |
| 2011/0231222 A1 | 9/2011 | Sharma et al. | |
| 2011/0289105 A1 | 11/2011 | Hershowitz | |
| 2011/0296517 A1 | 12/2011 | Grigoriev et al. | |
| 2011/0302210 A1 | 12/2011 | Comanescu | |
| 2011/0320925 A1 | 12/2011 | Piersol et al. | |
| 2012/0030553 A1 | 2/2012 | Delpha et al. | |
| 2012/0086989 A1 | 4/2012 | Collins et al. | |
| 2012/0136936 A1 | 5/2012 | Quintuna | |
| 2012/0192086 A1 | 7/2012 | Ghods et al. | |
| 2012/0222132 A1 | 8/2012 | Burger et al. | |
| 2012/0284605 A1* | 11/2012 | Sitrick | G06F 17/00 |
| | | | 715/230 |
| 2012/0323968 A1 | 12/2012 | Yih et al. | |
| 2013/0013560 A1 | 1/2013 | Goldberg et al. | |
| 2013/0061125 A1 | 3/2013 | O'Mara et al. | |
| 2013/0104028 A1 | 4/2013 | Murray et al. | |
| 2013/0151970 A1 | 6/2013 | Achour | |
| 2013/0191451 A1* | 7/2013 | Tse | G06Q 10/101 |
| | | | 709/204 |
| 2013/0219176 A1 | 8/2013 | Akella et al. | |
| 2013/0246901 A1 | 9/2013 | Massand | |
| 2013/0311420 A1 | 11/2013 | Tehranchi et al. | |
| 2014/0026025 A1 | 1/2014 | Smith | |
| 2014/0074905 A1 | 3/2014 | Schincariol et al. | |
| 2014/0089775 A1 | 3/2014 | Worsley et al. | |
| 2014/0101310 A1 | 4/2014 | Savage et al. | |
| 2014/0115436 A1 | 4/2014 | Beaver et al. | |
| 2014/0115450 A1 | 4/2014 | Zhong et al. | |
| 2014/0143446 A1 | 5/2014 | Jacobson et al. | |
| 2014/0173137 A1 | 6/2014 | Jacobson et al. | |
| 2014/0196115 A1 | 7/2014 | Pelykh | |
| 2014/0229556 A1 | 8/2014 | Cooper et al. | |
| 2014/0250073 A1 | 9/2014 | Zalpuri et al. | |
| 2014/0281875 A1 | 9/2014 | Branton et al. | |
| 2014/0282921 A1 | 9/2014 | Filman et al. | |
| 2014/0351907 A1 | 11/2014 | Noble | |
| 2015/0067150 A1 | 3/2015 | Heredia et al. | |
| 2015/0106378 A1 | 4/2015 | Clark et al. | |
| 2015/0134600 A1 | 5/2015 | Eisner et al. | |
| 2015/0169500 A1 | 6/2015 | Balinsky et al. | |
| 2015/0199379 A1 | 7/2015 | Thierer et al. | |
| 2015/0199416 A1 | 7/2015 | Kashyap et al. | |
| 2015/0227514 A1 | 8/2015 | Gillett et al. | |
| 2015/0236849 A1 | 8/2015 | Ayday et al. | |
| 2016/0156631 A1 | 6/2016 | Viswanathan et al. | |
| 2016/0224735 A1 | 8/2016 | Ayday et al. | |
| 2018/0004828 A1 | 1/2018 | Kathuria et al. | |
| 2018/0004829 A1 | 1/2018 | Kathuria et al. | |
| 2018/0097812 A1 | 4/2018 | Gillett et al. | |
| 2018/0375730 A1 | 12/2018 | Anand et al. | |
| 2019/0014395 A1 | 1/2019 | Anand et al. | |

FOREIGN PATENT DOCUMENTS

| | | |
|---|---|---|
| JP | 2003067330 A | 3/2003 |
| JP | 2005228253 A | 8/2005 |
| JP | 2007501969 A | 2/2007 |
| JP | 2009086742 A | 4/2009 |
| JP | 2010034920 A | 2/2010 |
| JP | 2011191862 | 9/2011 |
| JP | 2012209809 A | 10/2012 |
| KR | 20100080802 A | 7/2010 |
| KR | 20110000655 A | 1/2011 |
| KR | 101159504 B1 | 6/2012 |

(56) References Cited

FOREIGN PATENT DOCUMENTS

| KR | 20140092831 A | 7/2014 |
|---|---|---|
| WO | 2009105735 A2 | 8/2009 |

OTHER PUBLICATIONS

Eppstein et al., "What's the Difference? Efficient Set Reconciliation Without Prior Context?", SIGCOMM '11, Toronto Ontario, Canada, Aug. 15-19, 2011, 12 pages.
International Search Report and Written Opinion dated Aug. 28, 2015, International Patent Application No. PCT/US2015/014911, filed Feb. 6, 2015.
Kong et al., "Graphical Overlays: Using Layered Elements to Aid Chart Reading," IEEE Transactions on Visualization and Computer Graphics 18(21): 2631-2638, published online Oct. 9, 2012, print publication Dec. 1, 2012.
"Decision of Patent Grant dated Oct. 2, 2017," Korean Patent Application No. 10-2016-7015415, filed Nov. 10, 2014, four pages.
"Extended European Search Report, dated Oct. 27, 2017," European Patent Application No. 14859862.6, filed Nov. 10, 2014, 12 pages.
"Notice of acceptance for patent application dated Nov. 17, 2017," Australian Patent Application No. 2014346473, filed Nov. 10, 2014, 3 pages.
Canadian Office Action dated Jun. 28, 2018, Patent Application No. 2930415, filed Nov. 10, 2014, 4 pages.
Doi et al., "A proposal of an Annotation System CollabSticky Focused on Collecting Comments in Presentation," Information Processing Society of Japan 2007(1):159-164, Jul. 2007.
He et al, "RIDEE-SPS: Presentation System for Realtime Interactive Distance Education Environment," Information Processing Society of Japan 44(3):700-708, Mar. 15, 2003.
Japanese First Office Action dated Oct. 15, 2018, Patent Application No. 2018-138930, filed Nov. 10, 2014, 4 pages.
Japanese Final Rejection dated Mar. 26, 2018, Patent Application No. 2016-528236, filed Nov. 10, 2014, 4 pages.
Fujita et al., "Comprehensive Manual for Editing and Publishing Books for Amazon Kindle (p. 162)," MD Corporation, Inc., Jul. 21, 2013, 4 pages.
Japanese Final Rejection dated Mar. 4, 2019, Patent Application No. 2018-138930, filed Nov. 10, 2014, 3 pages.
Japanese Office Action dated Mar. 25, 2019, Patent Application No. 2016-528236, filed Nov. 10, 2014, 17 pages.
Chinese First Office Action dated Dec. 3, 2018, Patent Application No. 201480072858.7, filed Nov. 10, 2014, 8 pages.
Singaporean Notice of Eligibility for Grant and Supplementary Examination Report dated Dec. 24, 2018, Patent Application No. 11201603644X, filed Nov. 10, 2014, 3 pages.
Canadian Office Action dated Jun. 4, 2019, Patent Application No. 2930415, filed Nov. 10, 2014, 3 pages.
Chinese Notice of Grant dated Oct. 9, 2019, Patent Application No. 201480072858.7, filed Nov. 10, 2014, 4 pages.
Chinese Second Office Action dated Jun. 18, 2019, Patent Application No. 201480072858.7, filed Nov. 10, 2014, 3 pages.
Einziger et al., "TinySet—An Access Efficient Self Adjusting Bloom Filter Construction," IEEE/ACM Transactions on Networking 25(4):2295-2307, Aug. 2017.
Eppstein et al., "Straggler identification in round-bip data streams via Newton's identities and invertible Bloom filters," IEEE Transactions on Knowledge and Data Engineering 23(2):297-306, Aug. 19, 2010.
European Communication under Rule 71(3) EPC dated Jun. 7, 2019, Patent Application No. 14859862.6, filed Nov. 10, 2014, 48 pages.
Extended European Search Report dated Jan. 24, 2020, Patent Application No. 19204178.8, filed Nov. 10, 2014, 9 pages.
Goodrich et al., "Invertible Bloom Lookup Tables," 49th Annual Merton Conference on Communication, Control, and Computing, Sep. 28, 2011, 24 pages.
Japanese Appeal Decision dated Oct. 28, 2019, Patent Application No. 2016-528236, filed Nov. 10, 2014, 23 pages.
Wikipedia, "Portable Document Format," May 4, 2011 (retrieved Jun. 13, 2019), https://web.archive.org/web/20110504202116/http://en.wikipedia.org/wiki/PDF#Annotating_PDFs, 21 pages.

* cited by examiner

US 10,691,877 B1

HOMOGENOUS INSERTION OF INTERACTIONS INTO DOCUMENTS

CROSS-REFERENCE TO RELATED APPLICATIONS

This application incorporates by reference for all purposes the full disclosure of: co-pending U.S. patent application Ser. No. 14/077,204, filed on Nov. 11, 2013, entitled "DOCUMENT MANAGEMENT AND COLLABORATION SYSTEM", and co-pending U.S. patent application Ser. No. 14/077,201, filed Nov. 11, 2013, entitled "CROSS-PLATFORM HOMOGENOUS DOCUMENT COLLABORATION", and co-pending U.S. patent application Ser. No. 14/077,195, filed Nov. 11, 2013, entitled "HOMOGENOUS CAPTURE OF DOCUMENT INTERACTIONS."

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems. For example, computers of the organization may include personal computers, tablets, smartphones, laptops and other devices.

Furthermore, ensuring that the documents and other data are displayed uniformly cross-platform is challenging given the variety of hardware and software components of different devices. In addition to displaying documents and other data across a variety of platforms in a uniform manner, there are challenges in allowing users of the organization to edit and collaborate with others when accessing or editing the documents or other data on various devices.

BRIEF DESCRIPTION OF THE DRAWINGS

Various embodiments in accordance with the present disclosure will be described with reference to the drawings, in which.

DETAILED DESCRIPTION

Figure 1:
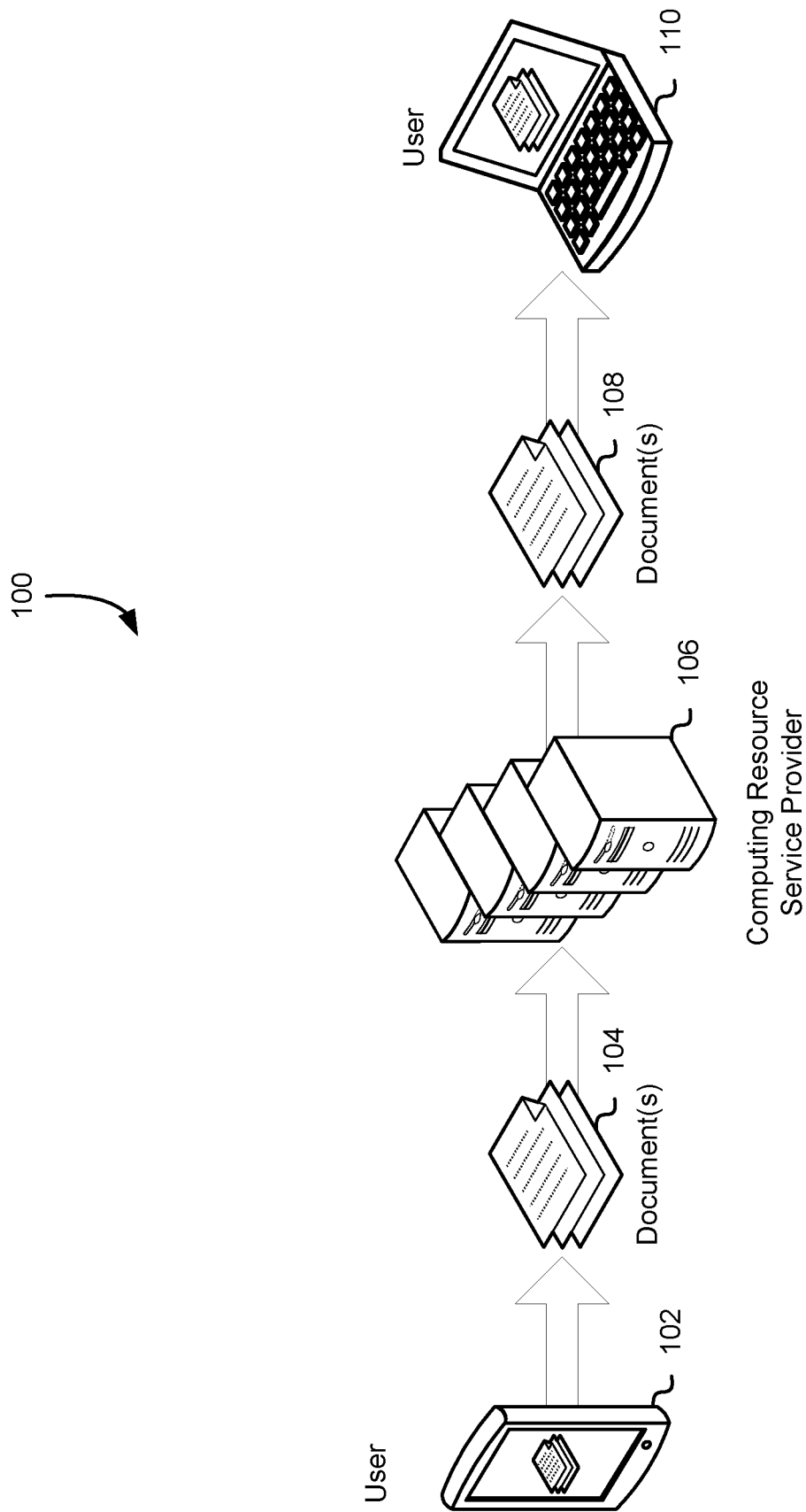
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for document management and document collaboration systems. Document collaboration between users of an organization's computer systems may be enhanced by converting documents into a universal file format, such as portable document format (PDF), and allowing users to edit, generate annotations or comments for selected words and phrases in the document. The document in universal file format may also be referred to as an underlay. Furthermore, if the document in PDF format (either natively or once it has been converted) is above a certain size it may be compressed, split into one or more documents, converted to another file format, the resolution of the document may be lowered or any other suitable technique for reducing the document's size may be used before the coordinate map is generated based at least in part on the document. In various embodiments, users may transmit documents to remote computing resources operated by a computing resource service provider. The service provider may, if the document is not already in a universal file format, convert the document to a universal file format. For example, a user may create a document on a computer system of an organization and transmit the document to the service provider to enable remote storage of the document and collaboration on the document with other users of the organization. The computer resource service provider (also referred to simply as a service provider) may then convert the document into a PDF version using one or more services or systems of the service provider. The service provider may then create a coordinate map based at least in part on the document in PDF format and the Cartesian (or other) coordinate system of the PDF file format. The generated coordinate map (also referred to as an annotation index) may be used for displaying user selections and annotations in the uploaded document. In various embodiments, the coordinate map may be a separate file from the document or may be included as information in the document. For example, the coordinate map may be stored in the document converted to the universal file format.

Users of the organization may request document(s) from the service provider using one or more computing devices, such as a tablet, smartphone, laptop, desktop, electronic book reader, workstation or any other suitable computing device. The service provider may then, as a result of the request, transmit the document, the generated coordinate map and any other data associated with the document to the computing device from which the user transmitted the request. The coordinate map may include one or more files generated from the document in the universal file format indicating the position of each word in the document or may be included in the document once it has been converted to the appropriate file format. The PDF file format contains a device independent coordinate system that may be used to display the PDF file. The coordinate map may be stored in the same remote storage systems as the document or in one or more other remote storage systems. In various embodiments, other data associated with the document includes comments, annotations or selections made by one or more users. Other data associated with the document may be combined into a single file (also referred to as an overlay) for use in displaying collaborations between users.

Once received by the computing device of the user, the computing device may display the document and the other data associated with the document based at least in part on the overlay, the coordinate map and the underlay. For example, the coordinate map may provide the coordinates for each word in the document and the overlay may be editiable, provide the annotations to the documents created by various users and the location of the annotations relative to the coordinates of the words in the coordinate map. The user may then collaborate on the document via the overlay, such as by editing the document (e.g., adding/removing text, images, tables, etc.), making selections and providing annotations to the document displayed to the user. These user's interactions may be captured by the computing device and stored at the service provider (e.g., the document may be displayed in a browser or network-accessible application and changes made to the document could be sent to the service provider) or locally until the user submits the document to the service provider for remote storage. For example, the user may type text or select a group of words from the document using a cursor controlled by a pointing device, such as a mouse. Once the user has made a selection and the computing device has determined that the user has completed the selection, the user may be prompted to perform one or more other actions, such as providing a comment or selecting a highlight function. The selection of words and actions performed by the user may be stored locally and the computing device may capture one or more other user interactions with the document. Once the user has completed collaboration on the document, the user may submit the document to the service provider for storage by selecting the submit operation. The computing device may then execute a batch job which transmits the locally saved user interactions to the service provider.

The batch job may include the underlay, the coordinate map and overlay along with the saved user interactions. Once received by the service provider, the service provider may store the document as a new version and update data corresponding to the document information. For example, the service provider may update the version information corresponding to the document. Saving each newly uploaded document as a new version of the document may include determining if any changes were made to the document, generating new underlays and overlays for the document, updating one or more search indexes corresponding to the document and notifying collaborators and owners of the document that a new version has been uploaded. Furthermore, local versions of the document may be preserved such that changes made to the document stored remotely will not be reflected in the local documents until the user has uploaded their local files and updated the local client. The user may also select a previous version of the document to roll back to. Each new version of the document may be assigned a new version identification number but retain that same document identification number. Saving each newly submitted document as a new version of the same document and preserving local files until they are submitted facilitates collaboration on the document without the need to use other files to manage conflicts between document versions.

In various embodiments, the saved user interactions include location coordinates for the edits, words selected by the user, and annotations associated with the location coordinates. This information may be stored separately as a new version of the overlay in a storage system maintained by the service provider, or may overwrite a previously stored version of the overlay or may be stored in the document itself. One or more databases may be used to record information corresponding to the underlay, coordinate map and overlay and the database may also contain the location of the underlay, coordinate map and overlay.

The coordinate map, overlay and other information generated based at least in part on various users' interaction with the document may be used to insert or add information to the document. For example, a user may select a portion of text in the document and associate a comment with the selected portion of text. The selection of text and associated comment may be stored by the service provider and may be inserted as a selection of text and associated comment into a version of the document. Direct edits, annotations, and/or comments generated by the users may also be inserted inline directly into the document (e.g., in a different color, font, or other effect to emphasize the interactions) or into a new version of the document. The document or new version of the document may then be processed by the service provider in order to generate a new underlay and coordinate map for the document. The annotations and/or comments generated by the users may be inserted or added to the document automatically once the overlay and other information has been received by the service provider or an author (also referred to as an owner) of the document may receive an indication that annotations and/or comments have been received and the author may select particular annotations and/or comments to insert into the document.

One or more applications causing the document to the displayed to the users may indicate to the user that the user's interactions with the document are being saved directly to the document. The one or more applications may then store the user's interactions with the document in the overlay and transmit the overlay to the service provider. The service provider may then insert information into the document based at least in part on the user's interactions with the document stored in the overlay. The service provider may also provide the users with access to one or more previous versions of the document such that the users can view one or more changes between different versions of the document. Furthermore, comments or other changes made to a particular version of the document may be requested by the users and the service provider may, in response to the request, provide the comments or other changes made in the document format the document was in when uploaded by the user responsible for uploading the document or some other format.

When the users publish a comment and/or annotation or the author accepts a comment and/or annotation, the service provider may receive an indication to insert the comment and/or annotation into the document. For example, the author of a document may access the document including comments and annotations using a single-page application (SPA) website operated by the service provider and select at least a portion of the comments and annotations to be inserted into the document. The SPA website may then transmit a request to one or more service of the service provider to inserted the comments and annotations selected by the author. In another example, the service provider may automatically insert all comments and annotations published by users authorized to collaborate on the document. The service provider or one or more services of the service provider may then receive the comment and/or annotation as an overlay associated with the document and retrieve the associated document. The service provider may, using one or more software libraries corresponding to the document format, extract the comment and/or annotation from the overlay and insert the comment and/or annotation into the document based at least in part on the coordinate map and information contained in the overlay. The document generated from inserting the comment and/or annotation may be stored by the service provider, the document may also be processed in order to generate a new underlay and coordinate map. The new underlay and coordinate map may enable other users to interact with the document.

The user's documents, including the underlay and overlay corresponding to the documents, may be processed by one or more systems or services of the service provider to enable document collaboration between different users on different devices in a homogenous manner across a variety of different software and hardware architectures. The service provider may convert all the documents to a document format which uses a device independent coordinate system to describe the surface of a page in the document. The documents may then be processed by the service provider as a stream of text in order to determine the location coordinates of each character. Each character's location may be determined by creating a bounding box around the characters. The service provider may then determine a bounding box for each line of the document. Based at least in part on the line bounding boxes and the character bounding boxes, the service provider may determine bounding boxes for the words in the document. Determining the bounding boxes for all the words in the document allows for selected text comments and annotations to be displayed in a uniform way across multiple different devices. The service provider processing normalizes the documents so that they can be displayed in an identical manner across a variety of different platforms and avoid load on the computing devices of the user. The coordinate map enables consistent display of the information contained in the overlay across multiple computing devices with different display characteristics, such as different resolutions, different display sizes, different aspect ratios and any other differences between the displays of the multiple devices. When used by the computing device to display the document, the coordinate causes the annotations to be displayed in connection with the same words regardless of the display characteristics of a particular display that displays the overlay and document.

FIG. 1 shows an illustrative example of an aspect of a document collaboration system in accordance with the present disclosure. Accordingly, FIG. 1 shows environment 100 which illustrates an example of a customer operating a computing device 102, such as a smartphone or tablet. During operation of the computing device 102 a user may interact with the computing device and cause operations on one or more documents and/or the creation of one or more documents. The documents and operations performed by the user may be saved locally on the computing device 102. The computing device may then, as a result of a request by the user, transmit the document(s) 104 to one or more systems 106 of the computing resource service provider. The one or more systems 106 of the service provider may be used by the service provider to provide services and resources. The documents 104 may be newly created documents by the user on the computing device 102 or the documents may be new versions of already existing documents which the user has collaborated on. The computing device 102 may transmit, to the service provider, the document and other data corresponding to the document such as metadata, user data, version data, underlay, overlay, comments, annotations, document identification information, coordinate map or any other data suitable for document collaboration.

Once received by the service provider, various systems 106 of the service provider may process the documents. For example, a system of the service provider may update a database with information corresponding to the document. Various other files may be created by one or more systems of the service provider such as the overlay, the coordinate map and the underlay. In various embodiments, the received documents 104 are converted to a universal file format (referred to as the underlay) from which the coordinate map may be created. File formats may include portable document format (PDF), an image file or any file format capable of identical display across different computing devices. The service provider may also generate an overlay based on the data submitted with the document. The underlay and the coordinate map may be used to uniformly display annotations and other information in the documents on other computing devices. One or more systems 106 of the service provider may store the original documents, the converted document, the coordinate map generated from the converted document, the overlay created and any other data corresponding to the document. Other data may include version history, permission, requests and any other data suitable for document collaboration.

Another user may request, from computing device 110, one or more documents 108 from the service provider. In various embodiments, documents 108 are the same as documents 104 transmitted from computing device 102. Computing device 110 may send a request to a system 106 of the service provider. The service provider may determine the document identifier from the submitted request and query a database to determine the location of the requested document and the corresponding files. The document identifier may be a globally unique identifier for a document which may be separate from a version identifier which may identify a particular version of the document. The corresponding files may include the coordinate map, overlay and any metadata associated with the documents. The service provider may collect the files and transmit the collected files to the computing device 110. In various embodiments, the service provider transmits the location of the files to the computing device 110 and the computing device requests the documents directly from the location transmitted.

In various embodiments, the user interacts with documents 104 on computing device 102. The interactions are stored in the overlay associated with documents 104 and transmitted to the system 106 of the service provider. The service provider then inserts the user's interactions stored in the overlay into the documents and creates new versions of the documents 108. The documents 108 containing the user interactions may be processed to generate a new underlay and coordinate map such that when the documents 108 are displayed by computing device 110 the display contains the user's interaction performed using computing device 102. The documents 108 transmitted to computing device 110 may include a new overlay associated with documents 108 or the computing device 110 may generate a new overlay upon receipt of the documents 108. The new overlay may enable user's interactions with the documents 108 to be captured and stored by computing device 110.

Once the computing device 110 has received the documents 108 and corresponding files, the documents may be displayed in such a way that when displayed on computing device 110, the documents appear the same as when displayed on computing device 102. For example, the service provider may transmit the overlay, underlay, the coordinate map and the corresponding metadata. The computing device 110 may use the coordinate map to determine where to draw the annotations stored in the overlay, such that they appear in the same place as the annotations appeared in the document when displayed by computing device 102. Various devices may display the images differently due to different screen sizes and resolutions, but the determination of where to draw the annotations is based on a device independent coordinate system and is not affected by differences in devices. If the service provider has inserted the information from the overlay into the document, the document may be displayed on computing device 110

Figure 2:
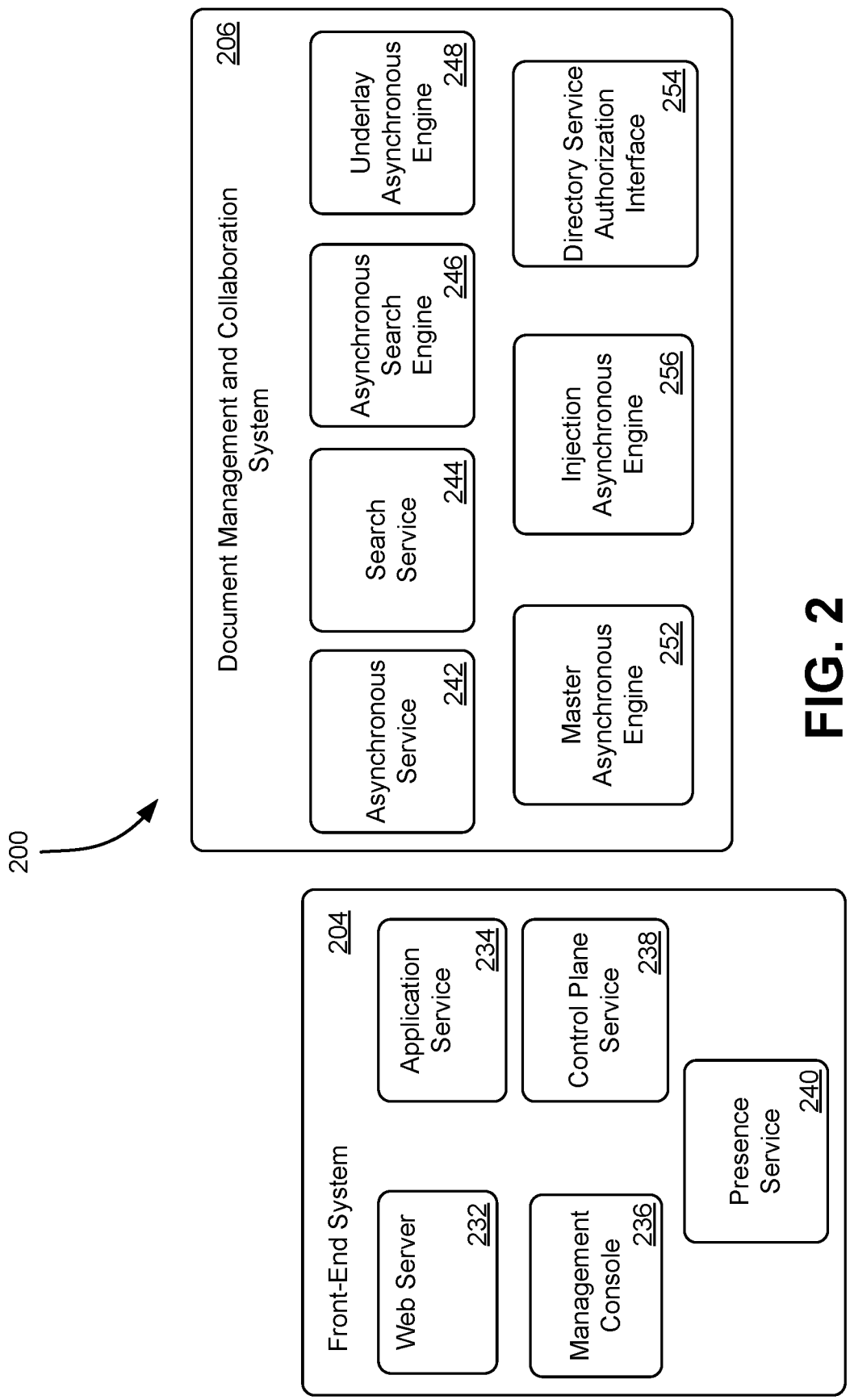
FIG. 2 shows an illustrative example of an environment in which various embodiments of the present disclosure may be practiced.

FIG. 2 shows environment 200 which illustrates an example of the functional entities of the front-end system and the document management and collaboration system in accordance with at least one embodiment. The front-end system 204 includes a web server 232, an application service 234, a management console 236, control plane service 238 and a presence service 240. The web server 232 may be a collection of computing resources collectively configured to enable the execution of a website, a single-page web application or a single-page interface that permits a user to transmit or upload documents to the document management and collaboration system 206 and manage the documents. The web server may further enable the user to view and edit documents, underlays or overlays or particular portions of the documents, underlays or overlays. The web server may also enable the user to provide commentary or feedback on the documents, underlays or overlays. The web server 232 may also enable an administrator or a user to set permissions or share modes that specify the privileges given to a user in accessing documents. In addition, the web server may enable users or devices to submit authentication credentials. The content distribution edge network may be used to distribute content of the web server 232. The actions performed by the user may be done via a website, an application or a management console and the web server 232 may enable executing the website, application or management console. Although one web server 232 is described with reference to FIG. 2 it may be contemplated that multiple web servers of any type may be used, whereby a portion of the web servers may be redundant.

The application service 234 may be a collection of computing devices and other resources collectively configured to serve as a user-exposed service that receives requests from the user and services the requests. A user request may be made using a website or a management console accessible to the user or a client that is executed on a user's device and may make service requests on behalf of the user. The request may be an application programming interface (API) function call and the application service 234 may process the request and manage its execution. The application service 234 may cause the synchronous execution of actions associated with a received request or alternatively may cause one or more actions that require more complex processing to be queued for asynchronous execution. The application service 234 may also be responsible for receiving user credentials and request authentication of the user from an authentication service. To cause the performance of operations requested by the user, the application service 234 may make one or more function calls to services or entities of the computing resource service provider. For example, the application service 234 may request user or access token validation from the managed directory service or may cause search indices maintained by the customer search service 244 to be updated.

The management console 236 may be a collection of computing devices and other resources collectively configured to permit organizations, administrators and users to register for utilizing document management and collaboration services. The management console 236 may be used in addition or as an alternative to a website or an application running on a user device and may permit users and administrators to make service requests using appropriately configured API function calls. For example, the management console 236 may be used for inviting a user to join a document collaboration system and view and collaborate on documents. Further, the management console 236 may be used for allowing dashboard access, audit log access, permission setting (for example, for administrators and user), storage limit setting (for example, for organizations and users) and security setting (for example, password and encryption). The control plane service 238 of the front-end system 204 may be a collection of computing devices and other resources collectively configured to serve as an interface that enables creating new computing instances for document collaboration and management.

The presence service 240 of the front-end system 204 may be a collection of computing devices and other resources collectively configured to provide information to users near contemporaneously with the generation of the information. The presence service 240 may communicate with one or more services of the document management and collaboration system 206 in order to provide information to one or more users. The presence service 240 may implement a WebSocket or other protocol to enable users of the document management and collaboration system 206 to receive updates to documents managed by the document management and collaboration system 206. The presence service 240 may provide a bi-directional communications channel between single-page web application or client application operated by the user and the web server 232 or one or more other services of the document management and collaboration system 206. For example, multiple users may edit a document simultaneously, such as during a meeting, the presence service 240 may receive updates to the document corresponding to users' interaction with the document through the particular user's client application. The presence service 240 may the transmit information corresponding to the users' interaction to at least one of the multiple users editing the document simultaneously such that at least one users received real-time updates to the document.

The document management and collaboration system 206 includes an asynchronous service 242, a search service 244, an asynchronous search engine 246, an underlay asynchronous engine 248, a master asynchronous engine 252, injection asynchronous engine 256 and a directory service authorization interface 254. The asynchronous service 242 may be a collection of computing devices and other resources collectively configured to manage the execution of asynchronous workflows. The asynchronous service 242 may include or be connected to a queue that stores asynchronous events for execution. The asynchronous service 242 may coordinate the execution of asynchronous workflows with the master asynchronous engine 252, which may be responsible for scheduling activities associated with the workflow. The activities may include underlay generation, text extraction and text insertion. As described herein, the execution of workflow activities or tasks may be performed by engines or workers. For example, the asynchronous search engine 246 may be tasked with performing text extraction activities and the underlay asynchronous engine 248 may be tasked with performing activities associated with underlay creation. Furthermore, the injection asynchronous engine 256 may be tasked with injecting annotations and comments into documents managed by the document management and collaboration system 206.

The injection asynchronous engine 256 may be a collection of computing resources collectively configured to insert annotations and/or comments into documents. The injection asynchronous engine 256 may receive published comments and annotations and retrieve a copy document associated with the published comments and annotations. The document may be in the document format as uploaded by the user responsible for the document or in another format. The injection asynchronous engine 256 may then inject the annotations and comments into the document based at least in part on information contained in the overlay associated with the document. For example, the overlay may contain the coordinates for the starting position and ending position for the in-line insertion of a particular annotation. The injection asynchronous engine 256 may then insert the particular annotation into the document using the coordinates for the starting position and the end position. Once the injection asynchronous engine 256 completed injection of the received published comments and annotations, the injection asynchronous engine 256 may cause the document to be saved in the object-level data storage service and enable one or more users associated with the document to access the document. Furthermore, the injection asynchronous engine 256 may cause one or more other asynchronous workflows to be initiated or queued. For example, after injection comments and annotations into a document, the injection asynchronous engine 256 may cause the document to be queued with the asynchronous service 242 in order to generate an underlay for the document and update the search service 244.

In the course of executing asynchronous workflows, the asynchronous search engine 246, the underlay asynchronous engine 248, and the injection asynchronous engine 256 may obtain or download documents or files from the object-level data storage service and cause documents or files to be stored in the object-level data storage service. Further, the engines may generate documents of any file type based on received documents, perform text extraction, text injection and store annotations. In addition, the asynchronous search engine 246 may place search index updates associated with document in a queue for processing by the search service 244. The updates may be associated with search indices maintained by the custom search service. The customer search service may be utilized for maintaining a search index of customer documents and their associated metadata. Further, to ensure consistent performance the searchable metadata or customer documents may be replicated to ensure consistent performance and guard against outages.

The search service 244 may be a collection of computing devices and other resources collectively configured to perform batch processing on the search index updates in the queue and launch a workflow for performing search index update activities. Upon launching the workflow, the asynchronous search engine 246 causes search indices to be updated in the custom search service 244. The directory service authorization interface 254 enables the document management and collaboration system 206 to delegate user authentication to another entity such as the managed directory service. The document management and collaboration system 206 may submit user access tokens to the authenticating party via the directory service authorization interface 254 and may receive a response indicating whether a user may be authenticated.

Figure 3:
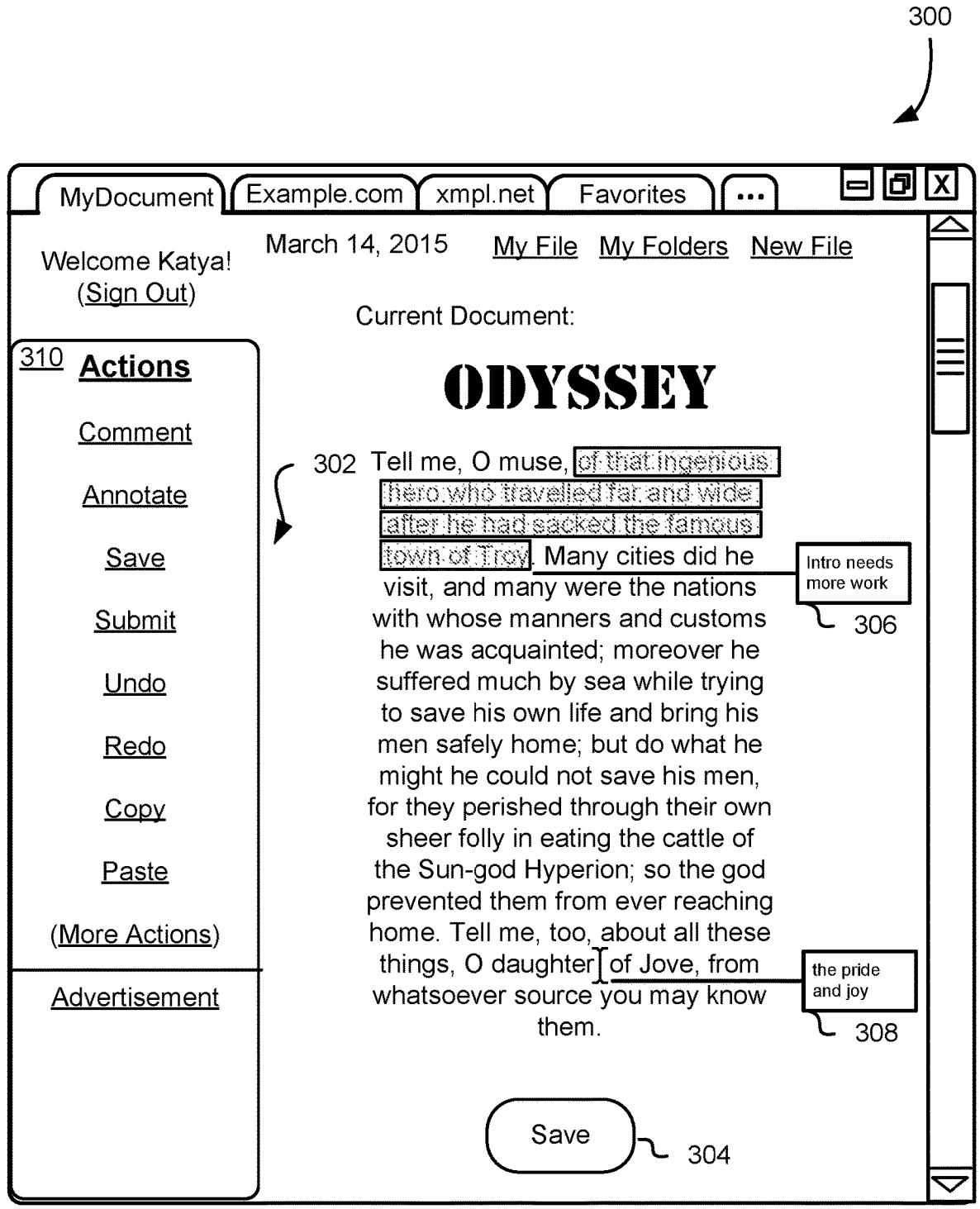
FIG. 3 shows a diagram illustrating a web page in accordance with various aspects of the present disclosure.

FIG. 3 is an illustrative example of a webpage 300 which may be used to provide uniform resource locators (URLs) in accordance with various embodiments. As illustrated in FIG. 3, the webpage 300 includes various content. The content illustrated in the webpage 300 is illustrative in nature and the type and appearance of content, as well as the amount of content, may vary in accordance with various embodiments. The webpage 300 may be provided in various ways in accordance with various embodiments. For example, the webpage may be provided over a network to an application such as a browser application of a client or a stand-alone application such as a mobile application of a client. The webpage 300, however, may be provided generally by any suitable device capable of receiving and processing a webpage. While a webpage 300 is used for the purpose of illustration, URLs or other resource locators configured in accordance with the various embodiments described herein may be provided with content in various ways in accordance with various embodiments. For example, content may be provided to a particular application of the client such as a synchronization client, which is not necessarily classified as a browser application. Generally, any way by which URLs or other resource locators may be provided are considered to be within the scope of the present disclosure.

As illustrated in FIG. 3, the webpage 300 includes various graphical user interface elements that enable navigation throughout a website of which the webpage 300 is a part. The user interface of webpage 300 may be presented in various ways, such as a smartphone or tablet application. In this example, the webpage 300 is part of an enterprise level document management and collaboration system. For instance, on the left-hand side of the webpage 300, various links 302 to various actions 310 that may be performed on the document may be displayed. In this example, the links appear as textual words which enable the links to be selected using an appropriate input device such as a keyboard, mouse, touchscreen or other input device. Selection of one of the links 302 may cause an application of the webpage 300 to be displayed, to submit, pursuant to a URL associated with the selected link by the programming of the webpage 300, an HTTP request to a server that provided the webpage 300 or another server. In this example, the webpage 300 also includes a graphical user element configured as a save button 304. The save button 304 may be a graphical user interface element of the webpage 300 where the underlying code of the webpage 300 is configured such that selection by an input device of the save button 304 causes information corresponding to the document and/or user interaction with the document to be saved locally or published remotely to the document management and collaboration system.

The webpage 300 may cause display of some or all of the current document the user is interacting with. The user may be interacting with the document using one or more appropriate input devices. For example, a user may highlight a portion of text with a mouse and select the "comment" link from the actions 310 on the left-hand side. This may prompt the user to enter comments associated with the selected text. The selected text and associated comments may be displayed on the webpage 300. The user may also select the "annotate" link from the actions 310 on the left-hand side of webpage 300. This may cause the application displaying webpage 300 to display a text insertion cursor 308 at a location indicated by the user. The text insertion cursor 308 may enable the user to insert text into the document. The text inserted by the user may be displayed as shown in FIG. 3 or the application displaying webpage 300 may cause the text to be displayed in-line as the user enters the text using an appropriate input device. The text inserted may be saved in the overlay associated with the document along with the location information of the text insertion cursor 308, an end location for the text insertion and any other information useable for inserting the text into the document by the document management and collaboration system.

The user may also select a portion of the text, annotations or comments to delete 306 from the document or may suggest deleting the selected portion of the text, annotations or comments. The user may also select the "replace" link from the actions 310 on the left-hand side of webpage 300. Selection of the "replace" link may allow the user to select a portion of text, annotations or comments and input data to replace the selection. When the document is received by another user, for example the owner of the document, the document may be configured such that the other user may select interactions performed on the document determine whether to incorporate the interactions into the document. For example, a first user may collaborate on the document by selection a region of text and performing a delete 306 operation on the selected text. The document may then be received by an owner of the document and the owner of the document may be provided the option of deleting the selected text from the document or rejecting the first user's interaction with the document.

A user may save annotations, comments, highlighted text and other information stored in the overlay by selecting the save function from either the actions 310 on the left-hand side or the save button 304 at the bottom of webpage 300. By selecting the save function the user's interactions with the document may be written to local memory such as a hard disk drive or transmitted over a network to the document collaboration system for remote storage. In various embodiments, user interactions are being periodically saved to local memory and saved as a draft. Furthermore, the application displaying webpage 300 may connect to a presence service, as described above in connection with FIG. 2. The presence service may receive the user's interactions with the document from the application displaying webpage 300 and may transmit other user's interactions with the document to the application displaying webpage 300. The application displaying webpage 300 may cause the other users' interactions with the document to be displayed in webpage 300.

User collaborations on the document may also be stored remotely with the service provider. For example, a user may collaborate on a document and upon completion submit the document to the service provider in order to be stored remotely. When a user selects to submit a document, the user's computing device may generate a batch job including the underlay, overlay, coordinate map, annotations, metadata and any other information suitable for processing of the document by the service provider. For example, the user's computing device may generate a hash of the files to be transmitted to the service provider for remote storage. The service provider may use the hash of the files to determine if any changes were made to the file. Furthermore, when the computing device is connected to the document management and collaboration server over a network (e.g., the Internet) the user's interaction with the document may be saved directly to the document management and collaboration server without first being persistently stored in local memory. The user's interactions may be visible only to the user until the user publishes their interactions with the document. Publishing the document may cause user interactions with the document stored as drafts by the document management and collaboration system to become visible to one or more other users with permissions to access the document.

During interaction with the document displayed by webpage 300 it may be possible for another user to interact with and submit edits to the same document from another device. The system may save the latest received document as the most recent version of the document. While the user is editing the document, the interactions that are saved locally may be preserved if even another version of the document is submitted during this time. Once the user has submitted the locally saved edits to the document, the system may generate a new version of the document based at least in part on the document submitted by the user and update the document and corresponding information saved locally based at least in part on any previous versions of the document not accounted for locally during the time the user was editing the document.

Figure 4:
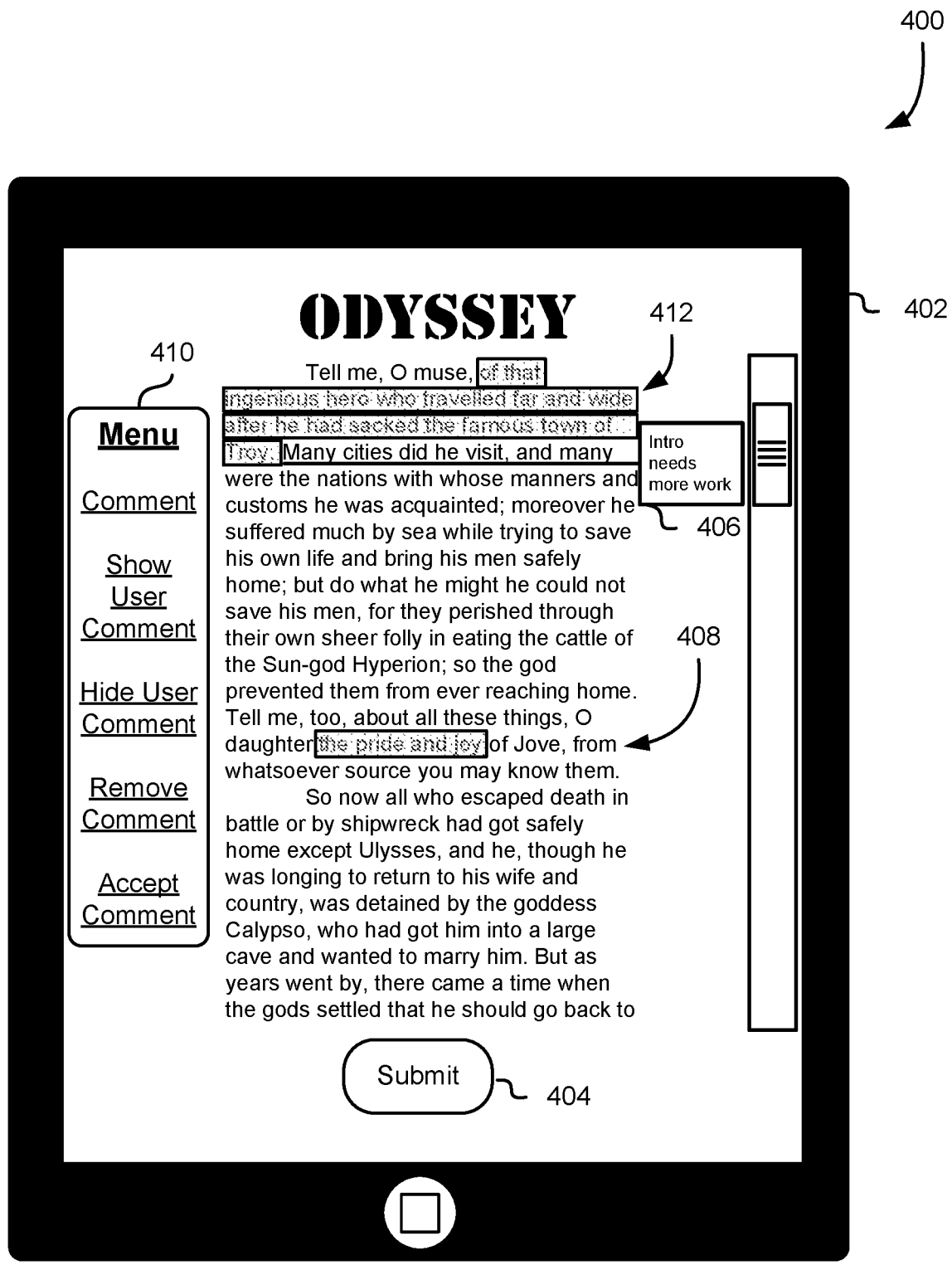
FIG. 4 shows a diagram illustrating a client application in accordance with various aspects of the present disclosure.

FIG. 4 is an illustrative example of a client application 400 which may be used to view, edit and create documents for use with the document management and collaboration system operated by the service provider. The client application may be executed by a computing device 402 such as the computing devices described above with reference to FIG. 1. Returning to FIG. 4, the client application 400 may be responsible for displaying documents, capturing user interactions with the documents, transmitting documents and corresponding information to one or more systems of the service provider, maintaining local copies of documents and corresponding information, retrieving documents and corresponding information from one or more systems of the service provider, synchronizing local documents with documents stored remotely from the device by the service provider and any other operation suitable for enabling document management and collaboration.

The content illustrated in the client application 400 is illustrative in nature and the type and appearance and amounts of content may vary in accordance with various embodiments. The client application 400 may be provided in various ways in accordance with various embodiments. For example, the client application 400 may be provided over a network to the computing device 402 such as an application browser of the computing device.

As illustrated in FIG. 4, the client application 400 includes various graphical user interface elements that enable navigation throughout the document management and collaboration system of which the document 412 is a part. In this example, the client application 400 is part of an enterprise level document management and collaboration system including various interfaces for creating, editing and collaborating on various documents. For instance, on the left-hand side of the client application 400 various menu options 410 are provided, allowing actions to be performed on various documents. In this example, the links appear as textual words which enable the menu options 410 to be selected using an appropriate input device such as a keyboard, mouse, touchscreen, or other input device. Selection of a menu option 410 may cause the client application 400 to execute one or more instructions stored in the memory of the computing device 402 causing performance of the selected menu option. For example, the user may select menu option 410 "Show User Comment," and this selection by the user may cause the computing device 402 to display a list of users that have provided comments to document 412. Using the appropriate input device, one or more users may be selected from the list and the highlighted words and associated comments are then displayed. In this way, the client application 400 may display all or a portion of the comments and annotations in a document.

Client application 400 may also be used to insert comments or annotations into a document 412. A user of the computing device 402 may receive a request from another user to collaborate on a document. The request may be received by client application 400 and the corresponding document and associated data may be retrieved by the client application 400 from a remote storage system operated by the service provider such as the storage system. The client application 400 may also be used to browse or view documents stored on the remote storage system of the service provider. Documents stored by the service provider may have one or more associated permissions, the permissions may control not only access to the document by particular users but also what documents are visible to a particular user when browsing via the client application 400. In this manner a user may search for and select a document for editing. In various embodiments, the client application 400 provides a search option for the user. The user may then enter a keyword or other information and search the documents stored in the storage system operated by the service provider. Once the user has determined a document for editing, the one or more systems of the service provider may determine a location of the document and associated data and transmit the location information to the client application 400. The one or more systems of the service provider may also transmit the documents and associated data directly to the client application 400.

The client application may display the document 412 using the data retrieved from the remote storage system including the underlay, coordinate map and overlay. In various embodiments, the underlay contains the document converted into the universal format with a device independent coordinate system used for displaying the document and the overlay contains the coordinates of user-selected text and associated annotations. Using this information and information contained in the coordinate map, the computing device 402 determines which coordinates to use when drawing the highlighted bounding boxes around the selected text in the document and displaying the associated comments. Furthermore, the overlay or other data associated with the document may contain information corresponding to comments and annotations inserted by one or more users into the document 412 and a particular document version when the comments and annotations where inserted into the document. For example, annotation 408 may have been inserted or removed by a particular user in a previous version of document 412. The user of computing device 402 may cause application 400 to display annotation 408 or information corresponding to annotation 408 by selection an option from the menu options 410.

The author or owner (or a group of authors or owners) of the document 412 may select comments and annotations to include or exclude from the document or a particular version of the document. The author of the document may receive a notification that one or more collaborators have provided annotations, comments or other interaction with the document to the document management and collaboration system. The author may have requested collaboration on the document from the one or more collaborators or the document management and collaboration system may have selected the one or more collaborators on behalf of the author. The author may then review the one or more collaborators' interactions with the document 412 through the client application 400. By selecting the appropriate option in the menu options 410 the author may accept or remove comments and other interactions with the document 412. If the author accepts one or more interactions with the document, the document management and collaboration system may cause the one or more interactions with the document to be injected into the document. For example, if the author accepts annotation 408 the document management and collaboration system may insert annotation 408 and generate a new underlay and coordinate map based at least in part on the document with annotation 408 inserted.

Collaborators and other users with permission to access the document may use client application 400 to download the document or a portion of the document, such as the comments and annotations inserted into the document. The downloaded document may also contain text, selections of text, annotations and comments removed from the document. The downloaded document may be configured such that interactions by collaborators in the document may be accepted or rejected. Once the interactions have been accepted or rejected the document may be uploaded to the document management and collaboration system and the document management and collaboration system determines which interactions in the document were accepted and rejected and incorporates the changes into the document stored with the document management and collaboration system. For example, an owner of a document may request to download a document from the document management and collaboration system in Microsoft Office Word® document format and the document management collaboration system by inserting collaborators' interactions into the document such that the owner may, through tracked changes, accept or reject collaborators' interactions inserted into the document. The owner may then upload the document to the document management and collaboration system and the document management and collaboration system may then determine, based at least in part on the uploaded document, which collaborators' interactions were accepted or rejected by the owner.

The user may then continue to interact with the document and enter more annotations as described above. The user may scroll down using a scroll bar or some other input method. The user may also zoom in or zoom out of the document 412. This may cause the client application 400 to redraw the document 412. Redrawing the document may change the size and amount of text shown on the screen, but does not affect the coordinates of the word bounding boxes in the coordinate map. The user may also request a copy of all or a portion of the document 412 or the interactions with the document 412. For example, the user may request all of the comments in the document and the document management and collaboration system retrieve the comments stored in the overlay, convert the comments to the document format of the document 412 or some other format and transmit the comments to the user.

In this example, the client application 400 also includes a graphical user element configured as a submit button 404. The submit button 404 may be a graphical user interface element of the client application 400 where the underlying code of the client application 400 is configured such that selection by an input device of the submit button 404 causes information corresponding to the document and/or user interaction with the document to be transmitted to the service provider for remote storage. The client application 400 may transmit the document, the underlay, coordinate map overlay, a hash of the files transmitted, document identification information, user authentication information and any other information suited for document collaboration.

Figure 5:
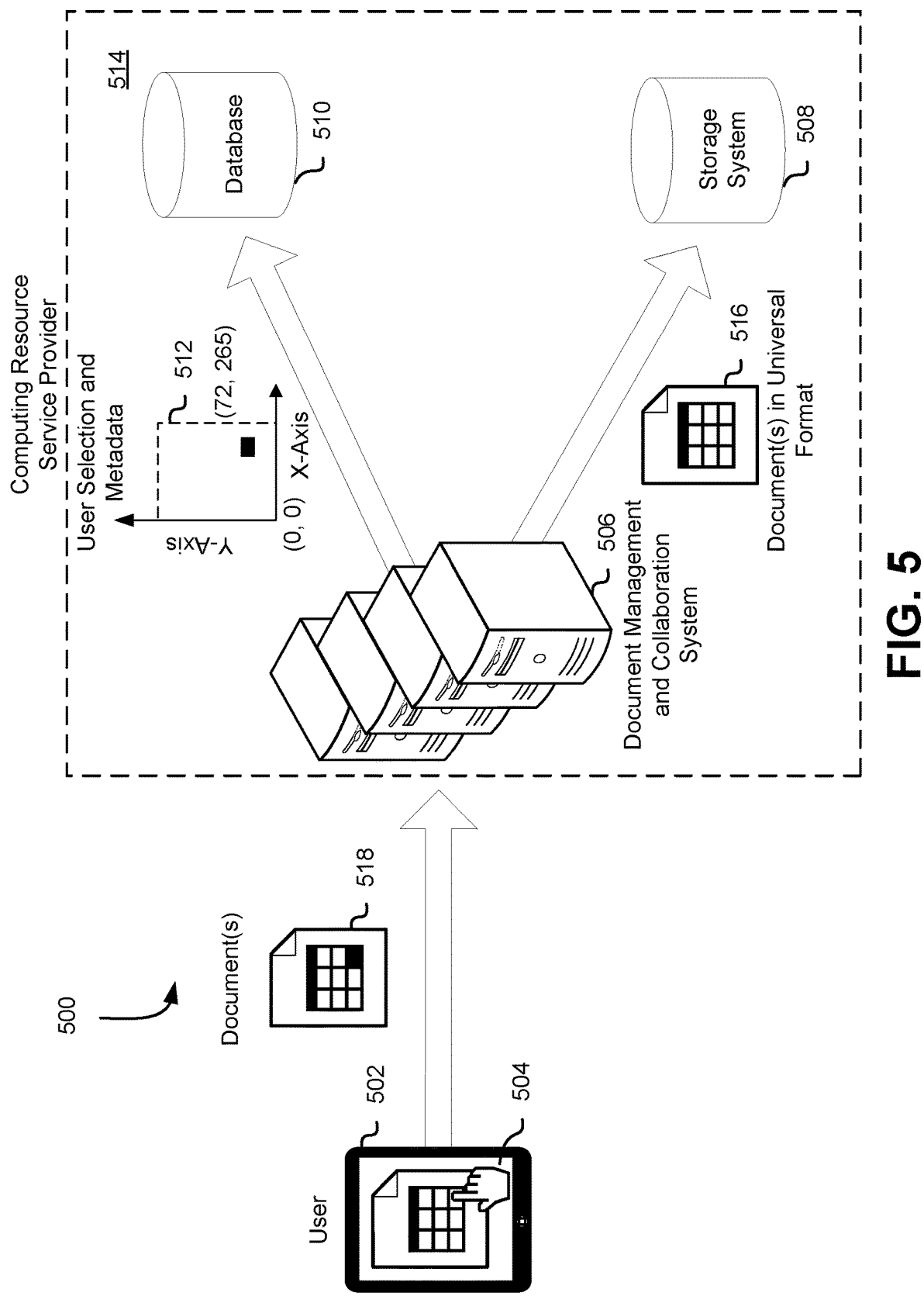
FIG. 5 shows a diagram illustrating document management in accordance with various aspects of the present disclosure.

FIG. 5 shows a diagram illustrating document management in accordance with various aspects of the present disclosure. In particular, FIG. 5 shows environment 500 which illustrates an example of a user operating a computing device 502 such as a smartphone or tablet. The user may have collaborated on the document by providing a selection 504 and associated annotation. The document may have been created by the user or may have been created by another user. The other user may have requested collaboration on the document. Collaboration on the document may include activities such as selection 504 of text and the creation of and/or modification of annotations corresponding to the selection. Once the user has collaborated on the document, the user may then submit the document to the service provider. Submission of the document to the service provider may include the computing device 502 transmitting the document 518 and associated data to the document management and collaboration system 506. The associated data may include created and/or modified annotations, comments, text selection or any other collaborative actions performed in the document.

In various embodiments, the transmitted files are received by one or more other systems of the service provider and are directed to the appropriate system or subsystem. For example, the service provider may operate one or more listening devices on a network responsible for receiving requests from users of the service provider and directing the requests to the appropriate system. These other systems may first cause the documents 518 and associated data to be stored in the storage system 508 of the service provider and provide notification to the document management and collaboration system 506 that documents 518 and associated data have been stored in the storage system 508. For example, a listening device may receive a request from the user to process documents 518 and associated data. The listening device may then cause the document 518 and associated data to be stored in the storage system 508. After the document 518 and associated data has been stored in storage system 508, the listening device may transmit a notification including a URL to the location of the stored file to the document management and collaboration system 506. Upon receiving the notification from the listening device, the document management and collaboration system 506 may download the documents 518 and associated data based at least in part on the URL included in the notification. The document management and collaboration system 506, the database 510 and the storage system 508 may be located in one or more data centers operated by the computing resource service provider 514 of the service provider.

The documents 518 and associated data may include the document in the file format it was originally received by the document management and collaboration system 506, annotations created by the user, a hash of the documents, a hash of the associated data, an overlay, an underlay, a coordinate map, a timestamp or any other information suitable for document collaboration. Furthermore, the documents 518 and associated data may be provided by an API call to the service provider. Once received by the document management and collaboration system 506, the document management and collaboration system may determine if the documents 518 have been changed. If the documents 518 have been changed, the documents can be saved as a new version of the documents 518. However, if the documents 518 have not been changed, they may not be processed and overhead from processing the files may be reduced. The document management and collaboration system 506 may determine if the documents 518 and/or the associated data has changed in a variety of different ways. For instance, the hash submitted with the documents 518 and associated data may be compared with a hash of a previous version of the documents and any associated data corresponding to the particular version of the document in order to determine if a change has been made. The hash may further include all or a portion of the file path to determine if a change has been made to the directory structure. In another example, an inverted bloom filter may be used to determine if a change has been made in the document.

Once it is determined that a change has been made to the documents 518 and/or the associated data, a new version of the document may be stored based at least in part on the documents 518 and associated data transmitted by computing device 502. Information corresponding to the document such as user selection of text in the document and corresponding metadata 512 may be written into a database 510 entry corresponding to the document. The user selection of text and corresponding metadata 512 may include metadata corresponding to the document and the particular version of the document. Furthermore, the information corresponding to the document may be based at least in part on the document 518 and data associated with the document as transmitted by the computing device 502. For example, a new version identification number may be generated and written into the database 510 along with the raw coordinate of the user's selection of text and associated annotations. Other information such as a Uniform Resource Locator (URL) for the documents 518 may also be written into the database. Information corresponding to the user responsible for submitting the documents 518 and associated data. The annotations or changes submitted by the user may also be stored in the database 510. In various embodiments, the database 510 contains the raw coordinates for the user selection and only the documents in universal format 516 are stored in the storage system 508.

After the information in the database has been updated, the document management and collaboration system 506 can store the new versions of the documents 518 and associated data. The document management and collaboration system 506 may retrieve the documents 518 and associated data from the storage system 508 of the service provider or the document management and collaboration system may have received the documents 518 directly from the computing device 502. The document management and collaboration system 506 may receive the underlay, the coordinate map and overlay from the computing device 502 and associated the underlay, the coordinate map and overlay with a new version of the document. If the documents 518 as received are not in the universal file format the document management and collaboration system may covert the documents 518 to a universal file format and generate the associated coordinate map. Along with the underlay and coordinate map, one or more thumbnail images of the documents may also be generated.

The document management and collaboration system 506 may store the annotations and/or comments included in the documents 518 and associated data when saving the new version of the document. As described above, the annotations to a document may be stored in a separate file which may contain both the annotations and the coordinates of the user selected text associated with the annotations. This information may be used by a user device to draw the highlighted words and the associated comments. The document management and collaboration system 506 may receive the user annotations and associated text selection directly from the computing device 502 from which the user entered the information or from some other service or system of the service provider. The document management and collaboration system 506 may update the annotation index using the user annotations and associated coordinates of the user selected words based at least in part on the bounding box for each word. The text of the annotations and/or the documents 518 may be extracted in order to enable searching of the documents. In various embodiments, the extracted text is transmitted to one or more other systems of the service provider in order to update a search index which enables users to search documents stored remotely by the service provider.

In various embodiments, all or a portion of the user selection and metadata 512 may be injected into the document by the document management and collaboration system 506. The user selection and metadata 512 may be injected into the document by the document management and collaboration system 506 once it has been received or it may be stored in database 510 and injected into the document once an indication to inject the user selection and metadata 512 has been received. The document management and collaboration system 506 may inject the user selection and metadata 512 by retrieving the document in the file format it was originally received by the document management and collaboration system 506 or a copy of the document in the format originally received and extracting data from the user selection and metadata 512. The extracted data may include user generated comments and annotations as well as the corresponding document coordinates for the user generated comments and annotations. Based at least in part on the document coordinates and the coordinate map corresponding to the document, the document management and collaborations system 506 may determine a start location and an end location for inserting the extracted data. Based at least in part on the start location and the end location the document management and collaboration system 506 may inject the extracted data thereby creating a new version of the document. The document management and collaborations system 506 or one or more other systems of the computing resource service provider 514 may then generate the document in universal format 516, underlay and coordinate map based at least in part on the new version of the document. The document in universal format 516 and other data generated based at least in part on the new version of the document may be stored in storage system 508. If only a portion of the user selection and metadata was injected into the document, the remainder of the user selection and metadata may be stored in the database 510.

After a new version of the document is stored, a notification may be sent to one or more users specified in the database. For example, the user specified as the owner or creator of the document may be notified that a new version of the document has been created. In another example, if the documents 518 and associated data were transmitted to a particular user for collaboration, the user responsible for having the documents 518 and associated data transmitted to the particular user may be notified that the requested collaborator has uploaded a new version of the document. The notification may be sent by one or more systems of the service provider and may include e-mail, SMS or any other suitable means for notifying a user.

New versions of the documents 518 and associated data may be stored by the service provider without an explicit command to make a new version of the documents 518 and associated data. For example, when a user collaborates on and/or edits a document and submits the document for storage with the service provider, the documents 518 and associated data transmitted from the user's computing device 502 to the service provider are used to store a new version of the document without an explicit command from the user to make a new version of the document. Furthermore, previous versions of documents 518 and associated data may be persistently stored in one or more storage systems of the service provider until deleted by explicit command to delete or another event (e.g., an account remaining inactive for a specified amount of time).

Figure 6:
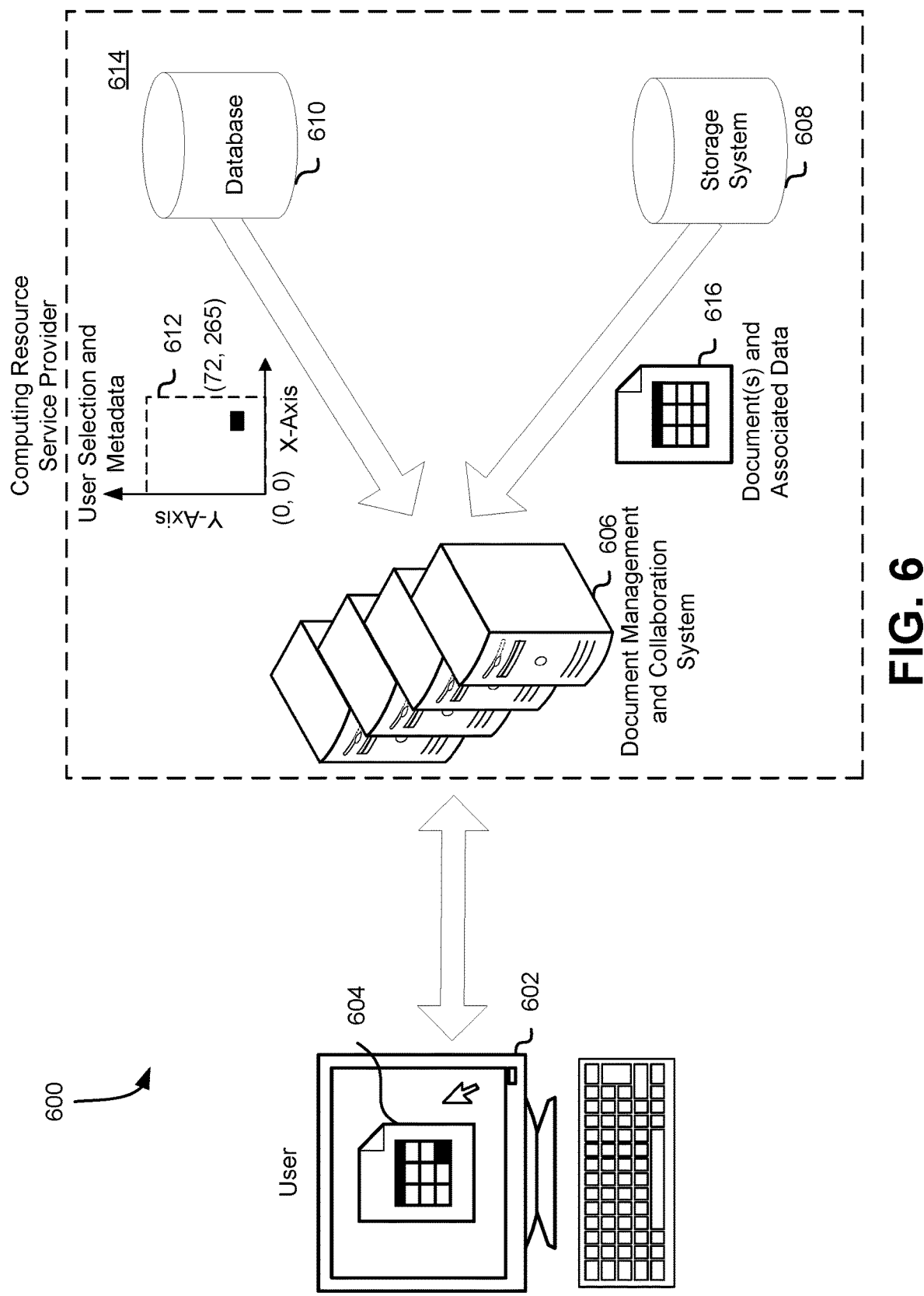
FIG. 6 shows a diagram illustrating document management in accordance with various aspects of the present disclosure.

FIG. 6 shows a diagram illustrating document management in accordance with various aspects of the present disclosure. Accordingly, FIG. 6 shows environment 600 which illustrates an example of a user operating a computing device 602 such as a personal computer or desktop computer. Using computing device 602 the user may request one or more documents 604 or portions of the documents 604 from the document collaboration and management system 606. In various embodiments, the one or more documents 604 are included in a request for collaboration from one or more other users. Once the document collaboration and management system 606 has received a request it may determine, based at least in part on the requested, one or more files to transmit to computing device 602. For example, the document collaboration and management system 606 may transmit one or more other users' interactions with the document in the document format the document was submitted in.

The document collaboration and management system 606 may determine the files to transmit by querying a database 610 for information corresponding to the request. For example, the request may include a document identification number or some other identifying information. The document collaboration and management system 606 may query database 610 based at least in part on information submitted in the request in order to determine a document or a particular document version to transmit to the computing device 602. In various embodiments, a request for collaboration on a document from a user includes a specific version of the document for which collaboration is requested. Based on the results returned from the database 610, the document collaboration and management system 606 may determine a location of one or more files to transmit to the computing device 602. For example, the document collaboration and management system 606 may determine an underlay, overlay, coordinate map and other data associated with the document to transmit to computing device 602. This may include user selection and metadata 612 associated with the document as well as the documents themselves 616.

The document collaboration and management system 606 may also determine a location of the files and transmit the location of the files to the computing device 602 enabling the computing device 602 to retrieve the files. The underlay and coordinate map may be stored in storage system 608 and the metadata corresponding to the document may be stored in database 610. The database 610, storage system 608 and the document collaboration and management system 606 may be located in the same datacenter operated by the computing resource service provider 614 or may be located in different datacenters. The document management and collaboration system 606 may also inject all or a portion of the user selection and metadata 612 into the documents 616 before transmitting the documents to computing device 602. Furthermore, if the user requests only the user selection and metadata 612 or a portion of the user selection and metadata 612, the document collaboration and management system 606 may retrieve the requested information from the database 610. For example, the user may request only a particular user's interactions with the document. The document collaboration and management system 606 may then retrieve the particular user's interactions with the document from the database 610 and transmit the particular user's interactions with the document to the computing device 602. The document management and collaboration system 606 may also convert the user selection and metadata 612 into the document format the document was originally submitted in or another document format.

When the document management and collaboration system 606 may inject all or a portion of the user selection and metadata 612 into the documents 616 before transmitting the documents to computing device 602, the document management and collaboration system 606 may inject the user selection and metadata 612 as comments into the document or directly as part of the document text. Furthermore, the injected user selection and metadata 612 may be injected into the document such that the user selection and metadata 612 may be accepted or rejected by a user of the document. The injected user selection and metadata 612 may also be anchored to the injection point based at least in part on the underlay and the coordinate map. For example, the document management and collaboration system 606 may maintain location information for the injected user selection and metadata 612 such that the document management and collaboration system 606 may maintain the user selection and metadata 612 location after it has been accepted or rejected.

Figure 7:
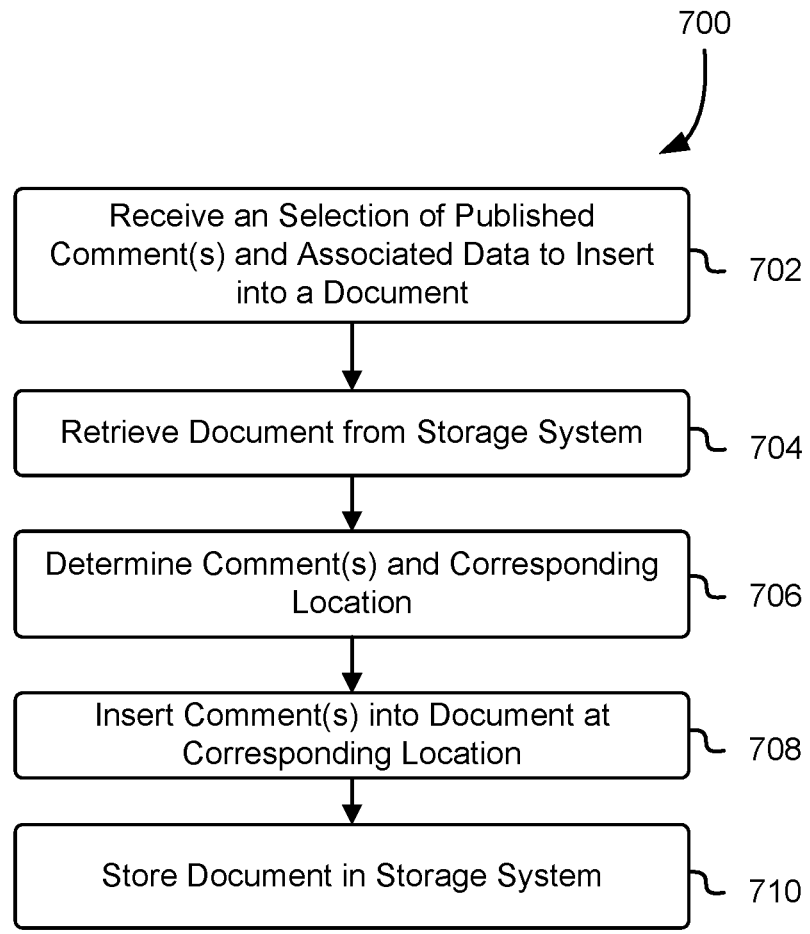
FIG. 7 shows an illustrative example of a process for inserting comments into a document in accordance with at least one embodiment.

FIG. 7 shows an illustrative example of process 700 which may be used to insert data into a document. The process 700 may be performed by any suitable system, such as the document management and collaboration system, as described in more detail below. Returning to FIG. 7, in an embodiment, the process 700 includes receiving a selection of published comments and associated data to insert into the document 702. The published comments and associated data may be generated by a user and transmitted by a computing device such as the computing device described in connection with FIGS. 3 and 4. The published comments and associated data may be received by one or more servers or listening device operated by the service provider. The associated data may include document coordinates corresponding to the comments. The comments and associated data may be stored in an overlay associated with the document. In accordance with the present disclosure, other data contained in the overlay may be inserted into a document by process 700. For example, annotations or images contained in the overlay may be inserted into the document associated with the overlay using process 700.

Once the document management and collaboration system has received the published comments and associated data, the document management and collaboration system may retrieve 704 the document associated with the comments from a storage system. The associated data may include a URL for the document associated with the comments or some other identifier for the document. The document management and collaboration system may use the document identification information, for example the document URL or URI, to retrieve the document from storage. In various embodiments, the document management and collaboration system may query a database for information corresponding to the location of the document. The document management and collaboration system may then determine 706 the comments to insert into the document and the corresponding location of the comments. The document management and collaboration system may determine the comments to insert based at least in part on the received selection and the overlay. The corresponding location may be determined based at least in part on document coordinates contained in the overlay and the coordinate map corresponding to the document.

Based at least in part on the comments and corresponding location, the document management and collaboration system may insert the comments into the document at the corresponding location 708. For example, using one or more libraries the document management and collaboration system may edit an extensible markup language (XML) file corresponding to the document, such as a Microsoft Office Word® document. The document management a collaboration system may insert the comments in the XML file and the corresponding location thereby causing the comments to be inserted into the document. Once the comments have been inserted into the document, the document management and collaboration system may then store the document in the storage system 710. The document management and collaboration system may also generate an URL or URI configured to enable access to the document in the storage system. Numerous variations of process 700 may be practiced in accordance with the present disclosure. For example, user interactions with the document may be inserted into the document automatically without receiving a selection of published interactions to insert into the document. The document management and collaboration system may also generate a new underlay and coordinate map for the document once the user interactions have been inserted into the document.

Figure 8:
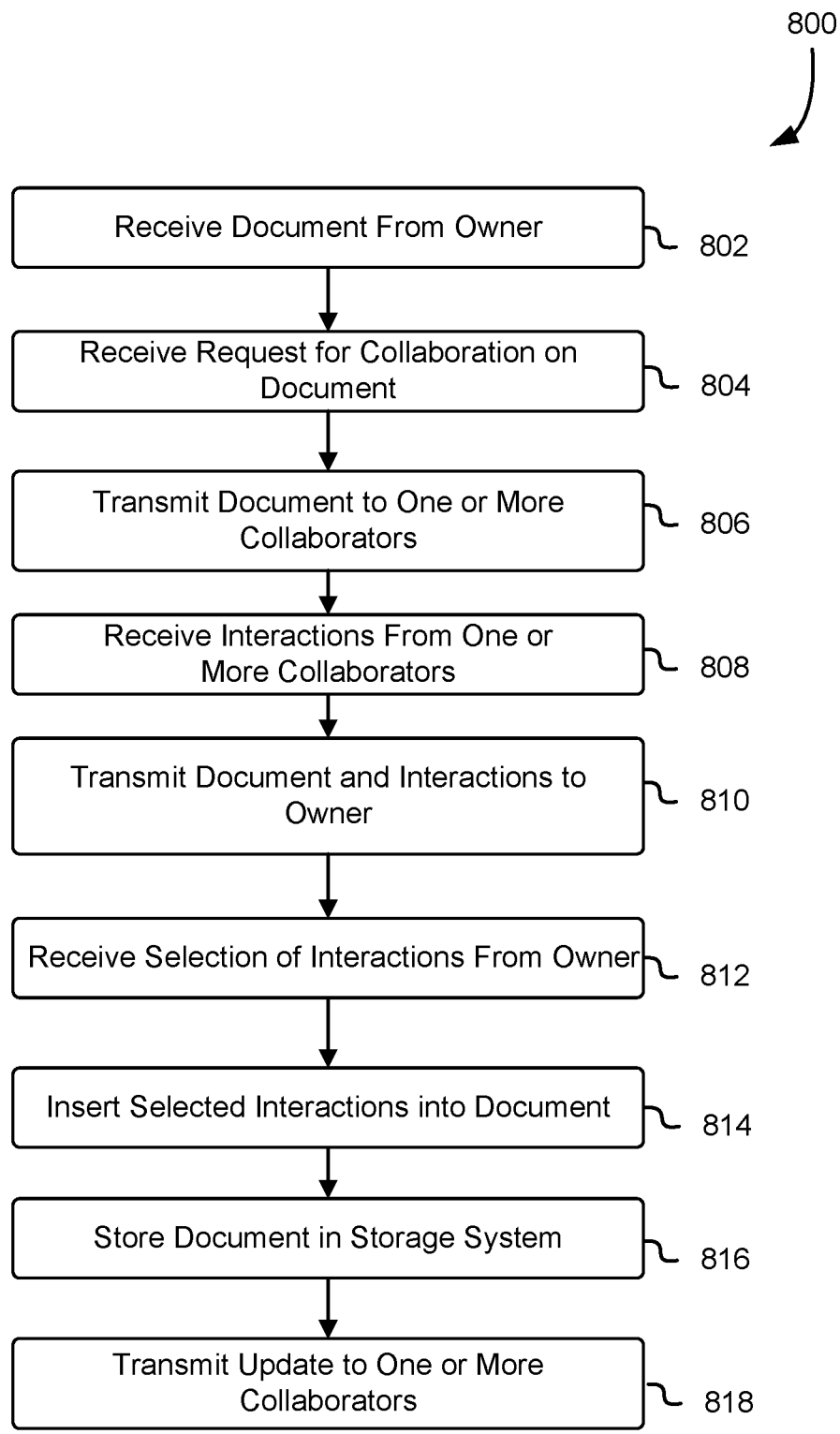
FIG. 8 shows an illustrative example of a process for updating a document based at least in part on comments to the document in accordance with at least one embodiment.

FIG. 8 shows an illustrative example of process 800 which may be used to insert data into a document. The process 800 may be performed by any suitable system, such as the document management and collaboration system, described in greater detail below. Returning to FIG. 8, in an embodiment, the process 800 includes, receiving a document from an owner 802. The document may be received over a network through a network interface of one or more server or listening devices operated by the service provider, as described above in connection with FIG. 2. The document may have been created by the owner using one or more applications executed by a computing device such as the computing device described in connection with FIGS. 3 and 4. The document management and collaboration system may receive the document and generate one or more files associated with enabling collaboration on the document such as the underlay, overlay and coordinate map. The document management and collaboration system may receive a request for collaboration on the document 804. The request may include identification information for one or more collaborators or may request that the document management and collaboration system determine at least one collaborator on the document. For example, an author of the document may be a member of an organization and select one or more other members of the organization to request collaboration from. The author may also request that the document management and collaboration system select member of the organization to request collaboration from on behalf of the author. The document management and collaboration system may then transmit the document to the one or more collaborators 806. In various embodiments, the document management and collaboration system transmits a notification to the one or more collaborators indicating a request for collaboration on a document.

The document management and collaboration system may receive collaborators' interactions with the document, such as comments, from one or more collaborators 808. The user interactions may be transmitted in an overlay and contain location information for the user interactions. The document management and collaboration system may then transmit the document and the interactions to the owner of the document 810. In various embodiments, the owner of the document may be the user requesting the collaborations, which may not necessarily be the user responsible for creating and/or uploading the document to the document management and collaboration system. The interactions may be transmitted to the owner in a single overlay or in multiple overlays. The interactions may also include information corresponding to the particular collaborator responsible for generating the interaction and may also include information corresponding to a particular version of the document the interactions correspond to. The owner may select one or more interactions of the collaborator to insert into the document. For example, the owner may navigate to a webpage displaying the document and collaborators' interactions as described above in connection with FIG. 3. Using a computing device, the owner may transmit a selection of interaction to the document management and collaboration system, which the document management and collaboration system is to insert into the document.

The document management and collaboration system may receive the selection of interactions from the owner 812. The selection may be received from a client application executed on a computing device, as described above in connection with FIG. 4. In various embodiments, the received selection includes an indication of one or more interactions to delete from the document. The document management and collaboration system may then insert the selected interaction into the document 814. The selected interactions may be inserted by the injection asynchronous engine described above in connection with FIG. 2. After insertion of the selected interactions into the document, the document may be stored in one or more storage systems 816, such as the storage system described above in connection with FIG. 5. The document may be stored as a new version of the document and information corresponding to the document version may be stored in a database, such as the database described in connection with FIG. 5. In various embodiments, storing the document includes generating a new underlay and coordinate map based on the document. The document management and collaboration system may transmit an update to the one or more collaborators 818. The update may include information corresponding to the document such as a location of the document or indication of whether the particular collaborators' interactions were inserted into the document. The update may be transmitted by a notification service operated by the service provider.

Numerous variations of process 800 may be practiced in accordance with the present disclosure. For example, process 800 may include receiving collaborations on a document in real-time such as during an online meeting. Process 800 may include the one or more collaborators and owner connection to a presence service such as the presence service described above in connection with FIG. 2. The presence service may enable the collaborators and owner to view the interactions of other collaborators near contemporaneously with the interactions. For example, a particular collaborator may select an area of text in the document and provide a comment, the computing device operated by the particular collaborator may transmit the interaction to a presence service and the presence service may then push the interaction to one or more other collaborators connected to the presence service. This may enable the owner to select interactions to insert in the document once the interactions have been pushed from the presence service.

Figure 9:
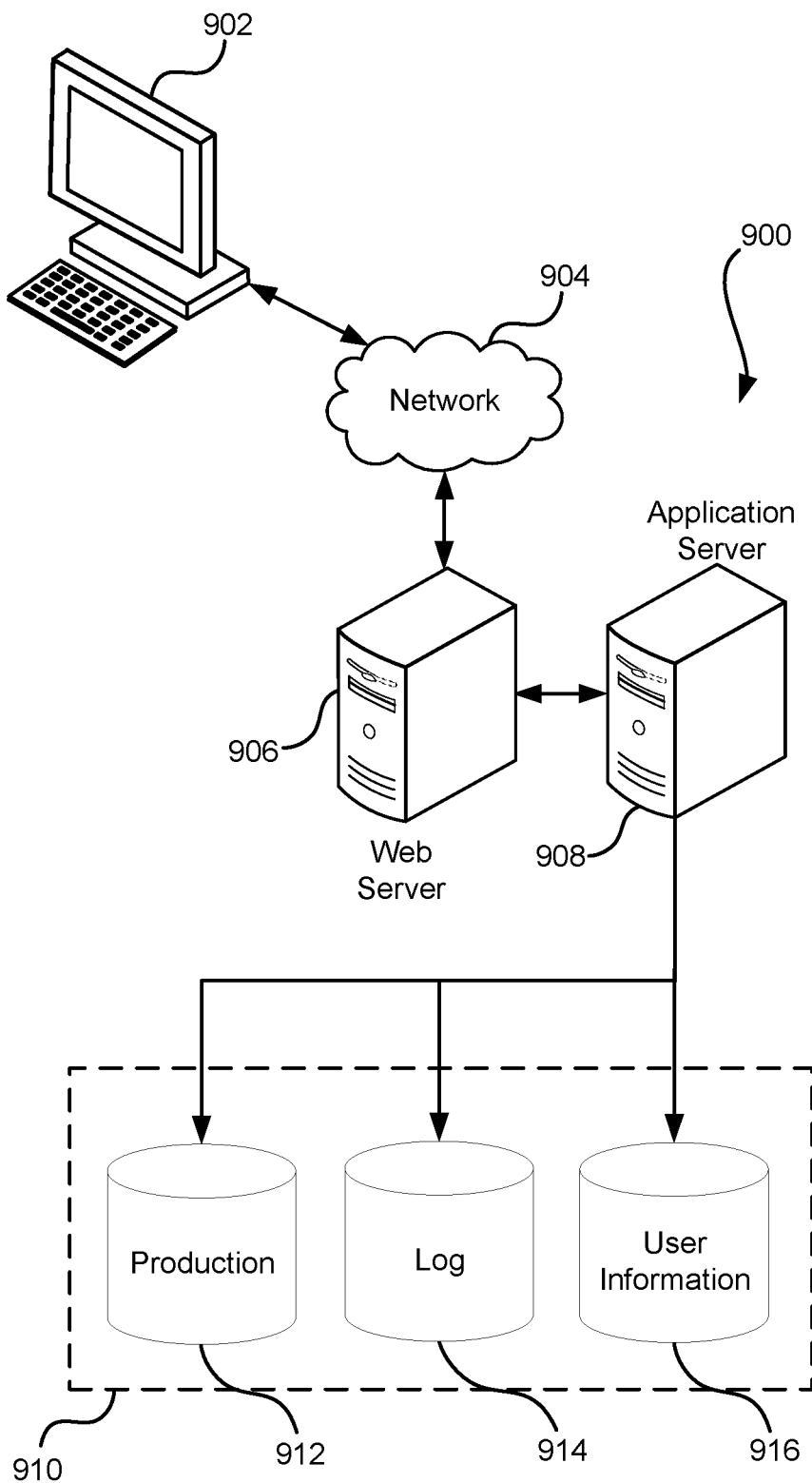
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving over a network, from a user, a selection of one or more annotations to be inserted into a document;
    retrieving the document from a storage system and an overlay associated with the document from a database, where the overlay contains data corresponding to the one or more annotations and location information specifying location coordinates of one or more characters of an existing underlay of the document;
    injecting the one or more annotations into the document, by at least:
        determining an injection point in the document for injecting at least one of the one or more annotations based at least in part on the location information and a coordinate map associated with the document;
        injecting the one or more annotations into the document based at least in part on the injection point;
        generating a new underlay based at least in part on the one or more annotations injected into the document and the existing underlay;
        determining new location coordinates for one or more characters of the new underlay based on the one or more annotations injected, the new underlay containing information corresponding to content in the document;
        generating a new coordinate map based at least in part on the new location coordinates for one or more characters of the new underlay;
        extracting at least a portion of content from the document; and
        updating a search index associated with the document based at least in part on the portion of content extracted from the document; and
    storing the document, and the new underlay in the storage system as a new version of the document such that the new version of the document and at least one other version of the document are accessible at a time.

2. The computer-implemented method of claim 1, wherein injection of the one or more annotations to be excluded from the new version of the document is based at least in part on a status of the user as an author of the document.

3. The computer-implemented method of claim 1, wherein the one or more annotations correspond to at least one collaborator's interaction with the document.

4. The computer-implemented method of claim 1, wherein receiving the selection of the one or more annotations to be inserted into the document includes receiving the selection as a push notification from a presence service of a service provider, the presence service responsible for transmitting the one or more annotations to the document to one or more users of the document connected to the presence service near contemporaneously with generation of the one or more annotations.

5. The computer-implemented method of claim 1, wherein the computer-implemented method further includes:
    receiving a request for at least a portion of the one or more annotations;
    generating a second document containing the portion of the one or more annotations and the second document being in a document format in which the document was originally uploaded; and
    transmitting, in response to the request, the second document.

6. The computer-implemented method of claim 1, wherein the computer-implemented method further includes:
    determining one or more collaborators on the document corresponding to the one or more annotations injected into the document; and
    transmitting a notification to the one or more collaborators indicating that the one or more annotations have been injected into the document.

7. A system, comprising:
    one or more processors; and
    memory with instructions that, as a result of being executed by the one or more processors, cause the system to:
        obtain data about one or more user interactions to be inserted into a document;
        determine a workflow comprising a first activity to convert an existing underlay of the document into a new underlay, the first activity to be asynchronously, executed from a second activity to initiate insertions of the one or more interactions into the document, and the new underlay associated with a new file format that is usable for providing identical display of the document across a plurality of devices;
        generate, in accordance with the workflow, the new underlay based on a conversion from the existing underlay and a coordinate map based at least in part on the data indicating one or more user interactions and data specifying location coordinates of characters in the new underlay, the data further indicating an insertion point for inserting the one or more interactions into the document, location coordinates of one or more characters in the new underlay being different than location coordinates of the one or more characters in the existing underlay of the document where the new underlay includes the one or more interactions inserted into the document; and cause the new underlay, the coordinate map, and the document containing the inserted one or more user interactions to be stored.

8. The system of claim 7, wherein the memory further includes instructions that, as a result of being executed by the one or more processors, cause the system to:
determine the insertion point for inserting the one or more user interactions based at least in part on insertion data extracted from an overlay and a coordinate map associated with the document, where the coordinate map contains document coordinates corresponding to content in the document.

9. The system of claim 7, further comprising extracting the one or more user interactions from an overlay, the extraction from the overlay executed asynchronously from conversion into the new underlay.

10. The system of claim 7, wherein receiving the one or more user interactions include receiving the one or more user interactions, at a remotely located service provider, from an owner of the document responsible for administration of the document.

11. The system of claim 7, wherein the memory further includes instructions that, as a result of being executed by the one or more processors, cause the system to:
generate a second document containing the one or more user interactions; and
transmit the second document to a user associated with the document.

12. The system of claim 7, wherein the memory further includes instructions that, as a result of being executed by the one or more processors, cause the system to:
receive, from a user, a second document containing one or more other user interactions;
determine, based at least in part on the second document, the one or more user interactions corresponding to the one or more other user interactions; and
cause the one or more user interactions corresponding to the one or more other user interactions to be stored.

13. The system of claim 7, wherein the memory further includes instructions that, as a result of being executed by the one or more processors, cause the system to transmit one or more requests for collaboration on the document, where the request includes the new underlay and the coordinate map.

14. A non-transitory computer-readable storage medium comprising executable instructions that, as a result of being executed by one or more processors of a computer system, cause the computer system to at least:
obtain a document and data about one or more user interactions with the document; and
insert the one or more user interactions into the document, by at least:
extracting data corresponding to the one or more user interactions from an overlay;
determining a set of points corresponding to location coordinates of one or more characters in the document for the one or more user interactions;
assigning a task to a queue, the task specifying one or more operations that generate a new version of the document asynchronously from the data and the determination of the set of points; and
executing the task in the queue to generate the new version of the document based at least in part on:
inserting the extracted data into the document at the location coordinates of one or more characters in the new version being different than other location coordinates of one or more characters in a previous version based at least in part on insertion of the extracted data; and
generating a new underlay based at least in part on an existing underlay and the extracted data inserted into the document and a new coordinate map based at least in part on the location coordinates.

15. The non-transitory computer-readable storage medium of claim 14, wherein the instructions that cause the computer system to determine the set of points corresponding to document coordinates for the one or more user interactions further include instructions that cause the computer system to determine the set of points based at least in part on an overlay corresponding to the document and a coordinate map corresponding to the document.

16. The non-transitory computer-readable storage medium of claim 14, wherein the instructions further comprise instructions that, as a result of being executed by the one or more processors, cause the computer system to receive a selection of the one or more user interactions to be inserted into the document.

17. The non-transitory computer-readable storage medium of claim 14, wherein the instructions further comprise instructions that, as a result of being executed by the one or more processors, cause the computer system to:
determine one or more users associated with the document and responsible for generating at least a portion of the one or more user interactions; and
transmit a notification to at least one of the one or more users indicating the new version of the document has been generated.

18. The non-transitory computer-readable storage medium of claim 14, wherein the instructions further comprise instructions that; as a result of being executed by the one or more processors, cause the computer system to:
receive a set of published user interactions from one or more users associated with the document; and
determine, based at least in part on a selection provided by a particular user of the one or more users, at least a subset of the set of published user interactions to insert into the document.

19. The non-transitory computer-readable storage medium of claim 18, wherein the instructions that cause the computer system to receive the set of published user interactions from the one or more users further include instructions that cause the computer system to receive the set of published user interactions from a presence service near contemporaneously with the publishing of the user interactions.

20. The non-transitory computer-readable storage medium of claim 14, wherein the instructions that cause the computer system to generate the new version of the document further include instructions that cause the computer system to cause a file format of the existing overlay to be changed into a new file format used to generate the new underlay, where the new underlay is usable for providing an identical display of the document across a plurality of devices.

* * * * *